United States Patent [19]

Nagaishi

[11] Patent Number: 5,365,600

[45] Date of Patent: Nov. 15, 1994

[54] IMAGE PROCESSING SYSTEM

[75] Inventor: Michihiro Nagaishi, Nagano, Japan

[73] Assignee: ATR Auditory and Visual Perception Research Laboratories, Kyoto, Japan

[21] Appl. No.: 74,519

[22] Filed: Jun. 11, 1993

[30] Foreign Application Priority Data

Mar. 19, 1993 [JP] Japan .................................. 5-060323

[51] Int. Cl.$^5$ ............................................... G06K 9/36
[52] U.S. Cl. ........................................ 382/41; 382/22
[58] Field of Search ....................... 382/22, 28, 41, 43; 395/86

[56] References Cited

U.S. PATENT DOCUMENTS 4,707,647  11/1987  Coldren et al. ..................... 382/28
5,054,098  10/1991  Lee ..................................... 382/44

Primary Examiner—Yon J. Conso
Attorney, Agent, or Firm—Lowe, Price, LeBlanc & Becker

[57] ABSTRACT

When an image is entered from an input means, a line extracting means extracts and smoothes the contour of that image to obtain a tangent line passing through a certain point on that contour. A region with the certain point as the origin is determined, where Hough transform of a straight line is carried out with the center point of that region as the origin. Hough transform is carried out for all the points adjacent to the origin to obtain an envelope. A tangent line is predicted by the obtained envelope.

4 Claims, 6 Drawing Sheets

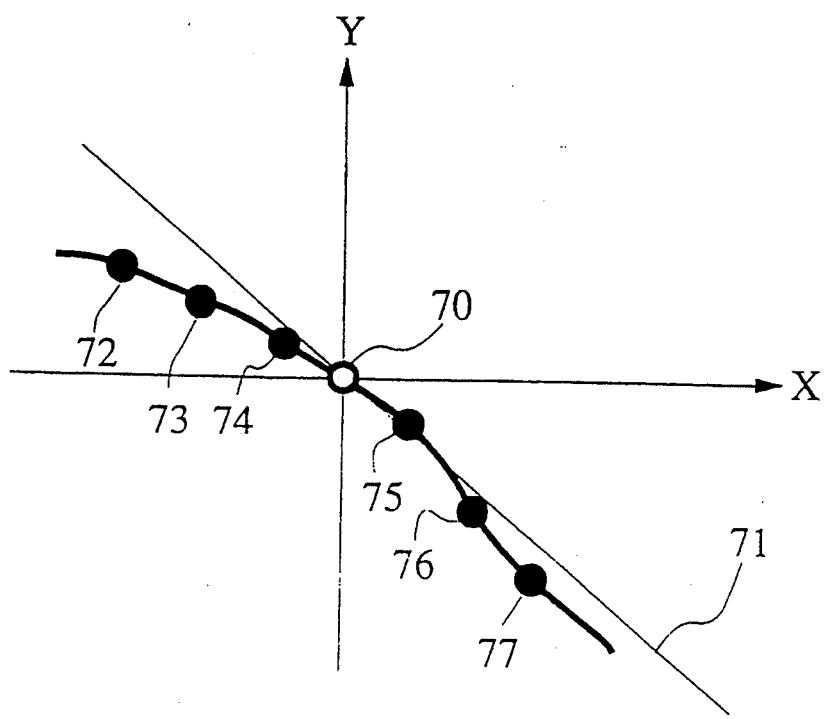

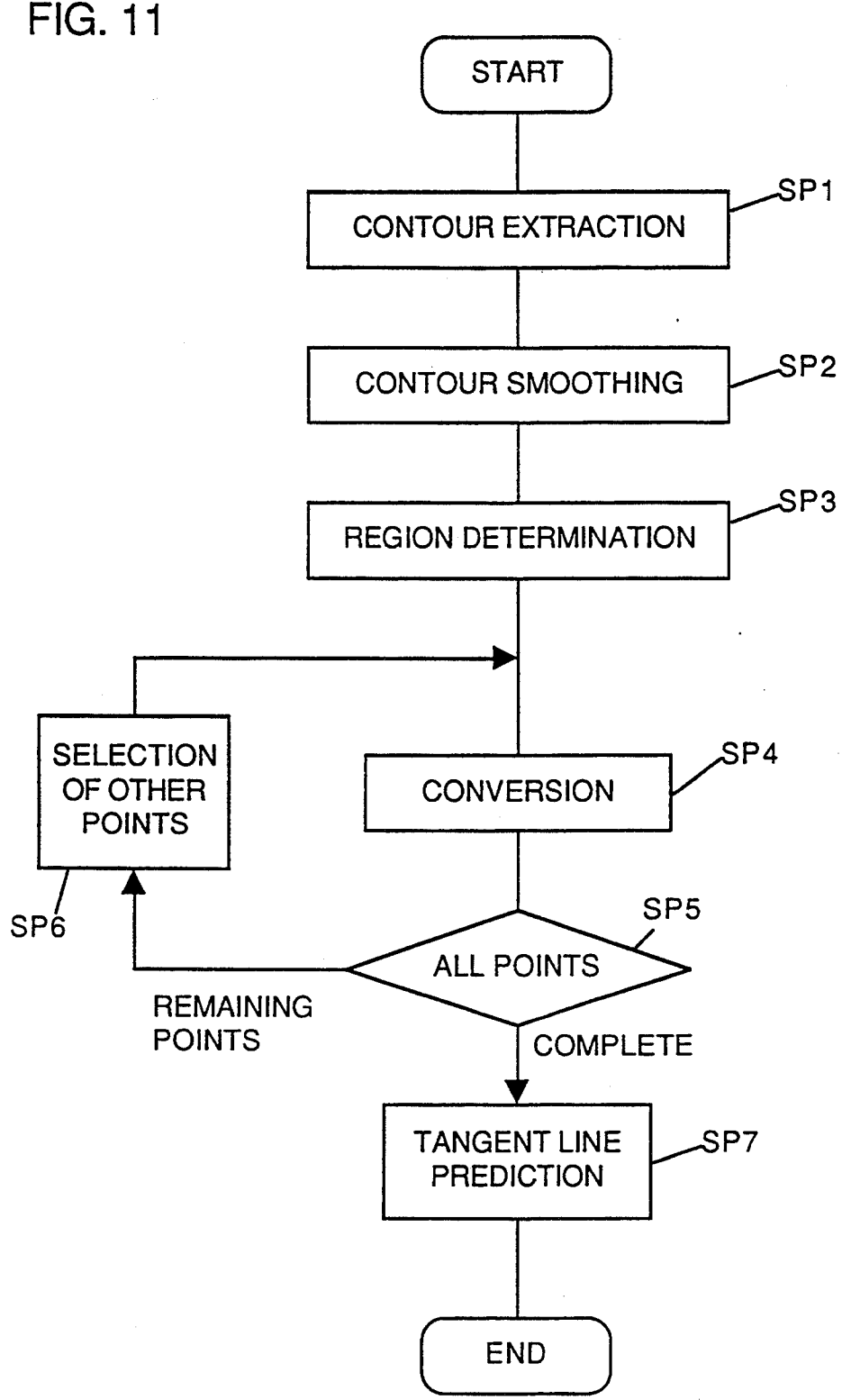

IMAGE PROCESSING SYSTEM

BACKGROUND OF THE INVENTION

1. Field of the Invention

The present invention relates to image processing systems. More particularly, the present invention relates to an image processing system that extracts lines of characters, diagrams and the like to provide the result thereof.

2. Description of the Background Art

A basic function of an image processing system is to extract a certain line based on an array of dots of an image such as characters and diagrams by obtaining line components of strokes of a character or tangent and normal lines on a contour of a figure. A typical conventional method of determining the direction of a normal line for each dot on a contour of a figure, for example, is set forth in the following.

First, a figure which is an electronic digitalized image is binarized to have the continuous state of the pixels identified, whereby a contour of a figure is extracted. Because the subject is a digital image, the extracted contour is appreciably uneven. If this is directly subjected to various processing steps, an error will be generated. Therefore, smoothing of the contour itself is carried out. Although smoothing the original diagram image by a filter prior to extracting a contour is an effective means, this is not sufficient for providing a smoothed contour. A smoothing operation for the contour itself is necessary. Smoothing of a contour can be carried out by applying a Gaussian filter and the like within a window centered about a certain point on the contour.

FIG. 2 is a diagram for describing the method of determining the direction of a normal line from a contour smoothed as described above. Referring to FIG. 2, there are three adjacent points of a point 20, a point 21, and a point 22 on a contour 25. In the case of obtaining the direction of the nominal lines of these points as shown in FIG. 2, the tangent line of each point on the contour 25 is obtained. The direction of 90° (or 90° in the opposite direction) with respect to the inclination of that tangent line is the direction of the tangent line. Therefore, obtaining the direction of a normal line is equal to obtaining the inclination of the tangent line of each point on the contour.

The most easy general method to obtain a tangent line includes a method of using the coordinates of adjacent points to obtain the inclination of a tangent line from the difference of the coordinate values. For example the inclination of the tangent line of point 21 can be obtained as follows. Assuming that the coordinate of point 21 is (X1, Y1) and the coordinate of point 22 is (X2, Y2), the inclination of the tangent line of point 21 can be obtained by:

$$(Y2-Y1)/(X2-X1) \qquad (1)$$

When the configuration of the contour is a simple one such as a circle, or when the arrangement of adjacent array of dots do not differ greatly in the proximity of a certain point, the direction of a tangent line can be predicted in high accuracy by obtaining the tangent line from the difference of the coordinate values. However, when the configuration of the contour is complex and not smooth, it will be difficult to predict a tangent line in high accuracy from the difference of the coordinate values due to the fact that the coordinate values are discrete values based on a digital image. Although the contour can further be smoothed using a filter and the like to improve the accuracy of a tangent line with respect to the smoothed contour line, the shape of the extracted contour per se may be modified. There is a possibility of the information concerning the configuration of the original contour being dropped significantly. Another possible measure is to carry out correction by interpolating the result determined by difference with the information of an adjacent point. However, this approach can not basically improve the accuracy of the direction of a tangent line because this interpolation is carried out on the basis that the entire contour is smooth.

Prediction of a tangent line can be carried out, not by the difference, but by a Hough transform. Hough transform is known as a method of predicting a line in accuracy based on several points distributed in a line manner. By using all the points within a certain range centered about each point on a contour, a tangent line can be obtained by predicting a straight line that passes through these points in the highest precision. However, because Hough transform identifies the most appropriate straight line upon calculation where all the candidate points are converted into polar coordinates, this method is time-consuming in comparison with the case where the difference of the coordinate values is used. Particularly, when the figure is great in size and the contour is long, a great amount of calculation time is required. Although a Hough transform can provide a straight line detection of high accuracy, there is a disadvantage of requiring a lengthy calculation time period. Therefore, in most cases, normal line detection is carried out using the difference of the coordinate values.

SUMMARY OF THE INVENTION

In view of the foregoing, the main object of the present invention is to provide an image processing system that can determine a line in high accuracy in a short calculation time without degrading the high straight line detection ability of Hough transform.

When an image is input, a straight line passing through a certain point on that image is predicted by Hough transform with that point as the origin, whereby a line is extracted to be provided as an extracted result.

According to the present invention, a line can be determined in high accuracy in a shorter calculation time period without degrading the high straight line detection ability of Hough transform.

In a preferable embodiment of the present invention, a contour is extracted according to the continuous state of pixels forming an input image. A region in which the extracted contour passes is determined, whereby Hough transform is carried out with the center point of the determined region as the origin to predict a contour.

More preferably, an extracted contour is smoothed by, for example, a Gaussian filter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram for describing a tangent line of a certain point on a contour.

FIG. 8 is a diagram for describing a region for Hough transform of the present invention.

FIG. 11 is a flow chart for describing the operation according to an embodiment of the present invention.

DESCRIPTION OF THE PREFERRED EMBODIMENTS

Figure 3:
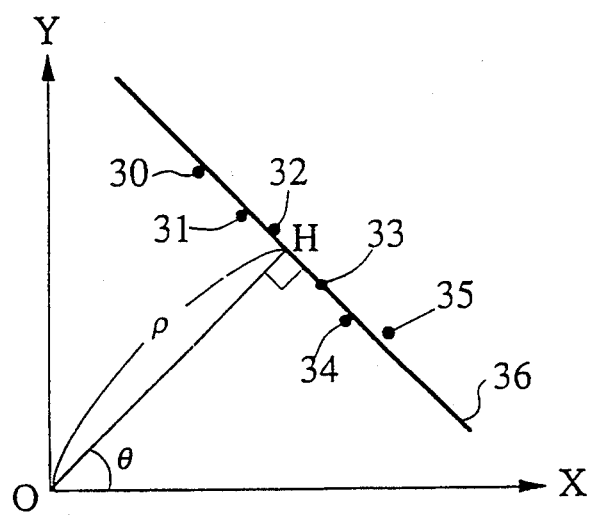
FIG. 3 is a diagram for describing the principle of Hough transform.

FIG. 3 is a diagram for describing the principle of Hough transform. The principle of Hough transform will be described prior to the description of an embodiment of the present invention. Referring to FIG. 3, points 30 to 35 are distributed in a linear manner on an X-Y plane. It is assumed that an original straight line is detected from points 30 to 35 which is a straight line 36. Assuming that the foot of the perpendicular line from the origin O to line 36 is H, OH=$\rho$, the angle between OH and the X-axis is $\theta$, and the coordinates of H is (x, y), straight line 36 can be represented by the following polar coordinates:

$$\rho = x \cos \theta + y \sin \theta \quad (2)$$

When $\rho$ and $\theta$ are variables, a group of straight lines passing through a certain point (x, y) can be represented by the above equation of (2).

Figure 4:
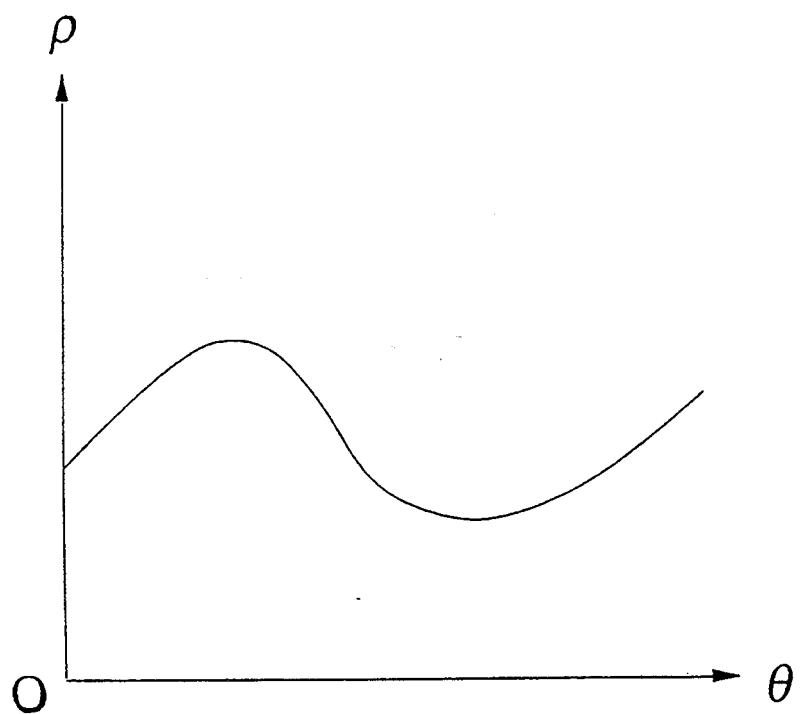
FIG. 4 is a diagram showing a straight line group passing a certain point on a plane of $\rho$-$\theta$.

FIG. 4 is a diagram showing a straight line group passing through a certain point on a $\rho$-$\theta$ plane. On $\rho$-$\theta$ plane, a group of straight lines going through a certain point can be expressed as a unitary curve. If $\rho$ and $\theta$ are determined in one to one correspondence, one straight line can be specified.

Figure 5:
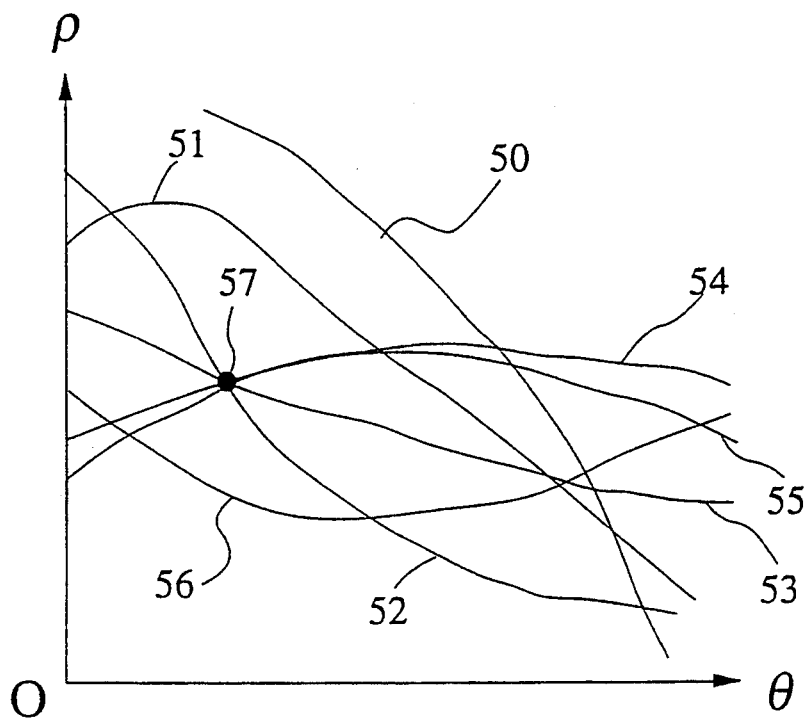
FIG. 5 is a diagram showing a straight line group corresponding to a plurality of candidate points on the plane of $\rho$-$\theta$.

FIG. 5 shows a group of straight lines for each of a plurality of candidate points on the $\rho$-$\theta$ plane. An example of obtaining a curve as shown in FIG. 4 according to the equation of (2) for each candidate point shown in FIG. 3 is represented in FIG. 5. Referring to FIG. 5, a plurality of curves 50 to 56 are drawn. The most appropriate straight line for the candidate points is a straight line of:

$$\rho = x \cos \theta_0 + y \sin \theta_0 \quad (3)$$

which is specified from a point 57 (P$_0$, $\theta_0$) through which the maximum number of curves 50 to 56 cross.

Figure 6:
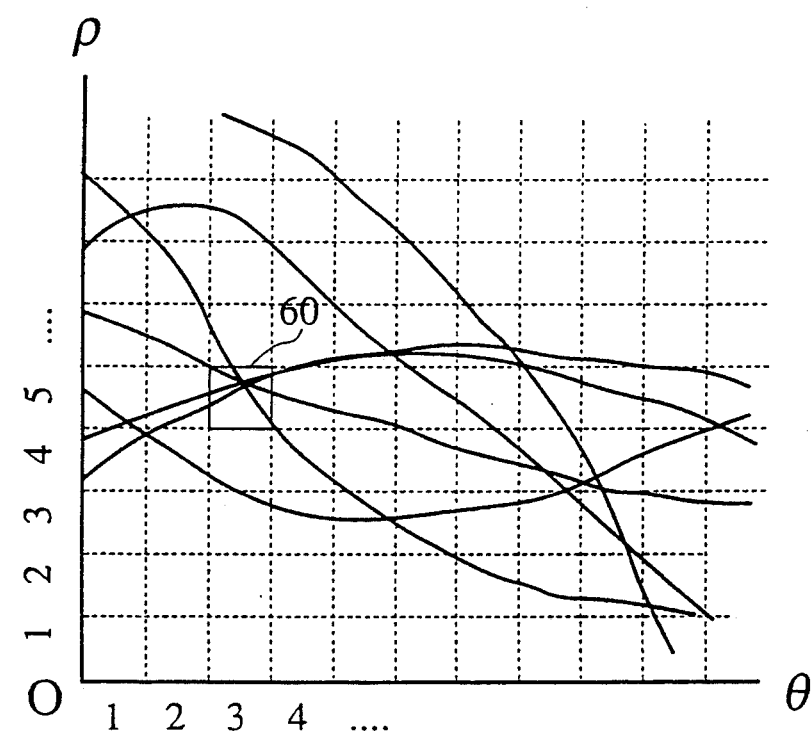
FIG. 6 is a diagram for describing a method of determining the most appropriate straight line for all the candidate points in a digital image.

FIG. 6 is a diagram for describing a method of determining a most appropriate straight line for all the candidate points in a digital image. Because $\rho$ and $\theta$ can not be processed as continuous values in a digital image due to its property of discrete values, the $\rho$-$\theta$ plane is divided in a mesh manner in equal distances of $\rho$ and $\theta$ as shown in FIG. 6, whereby the number of crossings of the curves are counted in each mesh cell. For example, in a mesh cell 60, the number of crossings is 4 which is the highest number. Therefore, a straight line of $\rho$=5, $\theta$=3 is the detected straight line.

Hough transform is a method that is significantly immune to noise in which a straight line can be extracted in a relatively reliable manner even when the candidate points are not continuous and vary greatly.

Because it is unlikely that the curves properly cross each other as in mesh cell 60 of FIG. 6 due to calculation error in a digital image, the number of points of curves crossing each other in each mesh cell is taken as the number of crossings. This means that if the size of a mesh cell is increased, the error in the digital image can be reduced, but the detection accuracy of the values of $\rho$ and $\theta$ is degraded. If the size of a mesh cell is reduced to improve the detection accuracy of the $\rho$ and $\theta$ values, it will be difficult to properly identify the error of the curve due to the influence of error in the digital image. It is therefore necessary to set the mesh cell to an appropriate size according to the characteristics of the image to be processed. In principle, a straight line group is calculated according to equation (2) for all the candidate points on the $\rho$-$\theta$ plane, followed by calculation of the crossing points of the curves. Therefore, a two-dimensional array representing the $\rho$-$\theta$ plane is necessary. If the mesh cell is small in size and $\rho$ and $\theta$ take a wide range of values, the required two-dimensional array will become great, resulting in a long time period for calculation. A method of reducing the calculation time is proposed by obtaining a straight line group for all crossings for a certain $\theta$ and gradually increasing the value of $\theta$ to carry out calculation, not with in a two-dimensional array, but with a one-dimensional array. However, the problem of determining the size of the mesh cell and the values of $\rho$ and $\theta$ and the operation of obtaining a straight line group of all the candidates points are not solved. Furthermore, this approach is still time consuming when the contour is very long. It can be said that this approach is not practical.

The principle of the present invention will be described hereinafter with reference to FIGS. 7, 8, and 9.

FIG. 7 is a diagram for describing a tangent line of a certain point on a contour. Referring to FIG. 7, there is a tangent line 71 passing through a point 70. A tangent line 71 is detected by Hough transform which is the most appropriate line that reliably passes through point 70 and that corresponds to points 72 to 77. In obtaining such a tangent line by the above-described Hough transform, a straight line group passing through all the candidate points of point 70 and points 72 to 77 on an X-Y plane with an arbitrary point as an origin is obtained as a curve on the $\rho$-$\theta$ plane. When tangent lines are to be obtained for the entire contour of a figure, the coordinates used in determining the coordinates of the contour can directly be used. More specifically, in obtaining tangent lines for all the dots of a contour, the used coordinates are common. Then, the values of $\rho$ and $\theta$ are obtained in which the crossings between the curve indicating a straight line group passing through point 70 and a curve indicating a straight line group going through points 72 to 77 are maximum in number. A tangent line going through point 70 is determined by the values of $\rho$ and $\theta$.

In the present invention where Hough transform is carried out, the origin of the X-Y plane coordinates is set as point 70 of which a tangent line is to be obtained. Similarly, when a tangent line is to be obtained at point 72, the origin is set to point 72. In this manner, the origin for each point on the contour is specified.

FIG. 8 is a diagram for describing a region in which Hough transform of the present invention is to be carried out. Referring to FIG. 8, a region of 5×5 dots is specified centered about a point P0. In this case, the origin of the X-Y plane coordinates is set to P0. Points P1 to P4 are a partial contour viewed centered about point P0.

Figure 9:
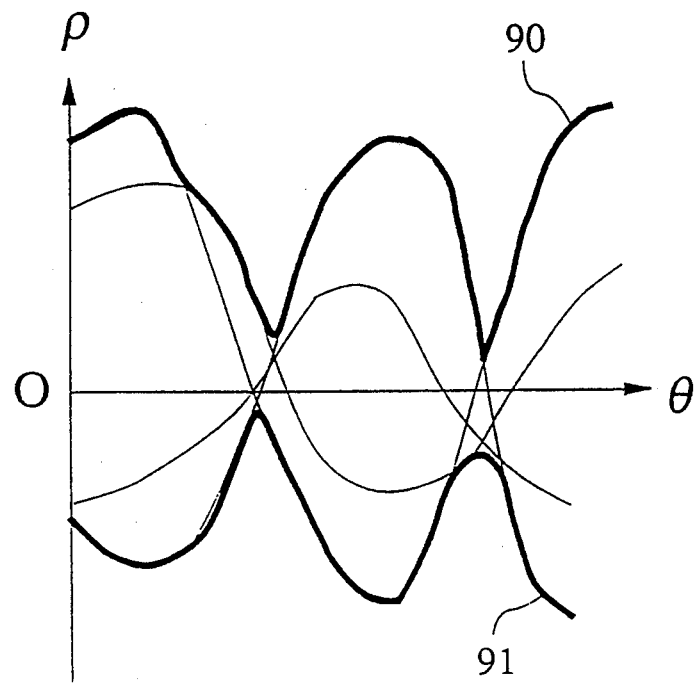
FIG. 9 shows the straight line group passing through points P1 to P4 as a curve on the plane of $\rho$-$\theta$ in the X-Y plane coordinates where point P0 shown in FIG. 8 is the origin.

FIG. 9 is a diagram in which the straight line group passing through points P1 to P4 are obtained as curves on the $\rho$-$\theta$ plane from equation (2) in the X-Y plane coordinates with point P0 shown in FIG. 8 as the origin. An envelope 90 is formed of a curve according to the maximum $\rho$ in each $\theta$, and an envelope 91 is formed of a curve according to the minimum $\rho$ in each $\theta$.

Because the straight line passing through point P0 is a straight line of p=0, it is the $\theta$ axis. Therefore, the most appropriate straight line for other points and that passes through point P0 is determined by the value of $\theta$ having the greatest number of crossings with the $\theta$ axis. In an actual digital image, a proper value of $\theta$ can not be obtained from the number of crossings with the $\theta$ axis because the error is great. Therefore, the location that has the smallest difference between envelopes 90 and 91 is assumed to be the location where the number of crossing with the $\theta$ axis is greatest, whereby the inclination of a tangent line can be identified from the value of $\theta$ of that location.

An embodiment of an image processing system of the present invention will be described hereinafter in accordance with the above-described principle.

Figure 1:
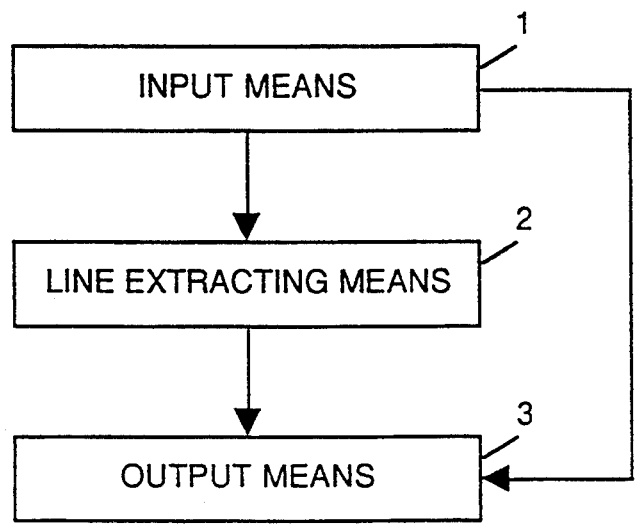
FIG. 1 is a block diagram schematically showing an embodiment of the present invention.
Figure 2:
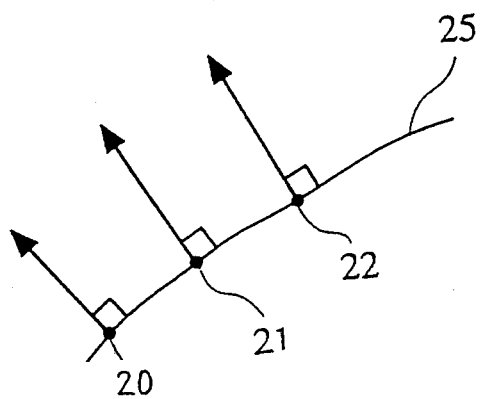
FIG. 2 is a diagram for describing a method of determining the direction of a normal line from a conventionally smoothed contour.

FIG. 1 is a block diagram schematically showing an embodiment of the present invention. An image processing system of the present embodiment includes input means 1 for entering an electronic image, line extracting means 2 for estimating a straight line that passes through a certain point on the image input by the input means 1 in accordance with Hough transform with the certain point as the origin, and output means 3 for displaying the output results and status of input means 1 and line extracting means 2.

Figure 10:
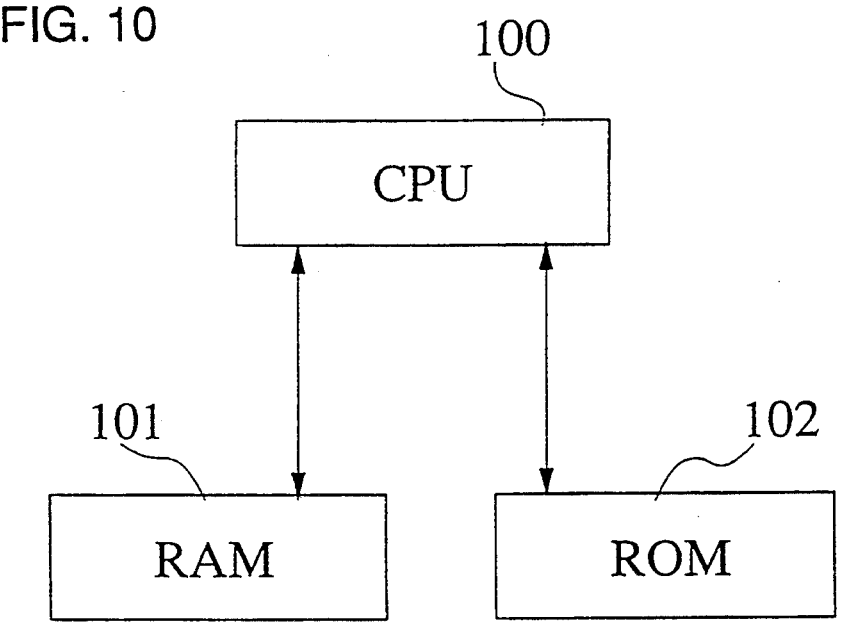
FIG. 10 is a diagram showing a general electrical structure of an embodiment of the present invention.

FIG. 10 shows a general electrical structure of an embodiment of the present invention. In FIG. 10, a CPU 100 serves to execute the line extraction in the line extracting means 2 shown in FIG. 1. Data such as line extraction is temporarily stored in a RAM 101. Data required for line extraction algorithm is stored in a ROM 102.

FIG. 11 is a flow chart for describing the operation of an embodiment of the present invention. As a specific operation of the present invention, an operation of a process for extracting a contour of a figure which is a typical image processing step by predicting the direction of a normal line of each point on the contour by estimating the tangent line of each point will be described according to FIG. 11 with reference to FIGS. 1, 7, 8 and 9. When an image such as a figure is entered by input means 1, CPU 100 identifies the continuous state of the pixels from the image of a character or a diagram entered from the input means 1 to extract a contour at step (abbreviated as SP in the drawing) SP1. Because the input image is generally a digital image, the extracted contour will be significant in its unevenness. To avoid error in the processing steps, CPU 100 carries out a smoothing operation of the contour at step SP2. This smoothing is carried out by a process such as applying a Gaussian filter.

A tangent line going through a certain point 70 as shown in FIG. 7 on the obtained contour is to be found. First, a coordinate with point 70 as the origin is specified. Then, a region (for example 5×5 dots) as shown in FIG. 8 centered about point 70 is determined at step SP3. The region is set to an appropriate size according to the configuration of the contour. In the present embodiment, transformation is carried out with a region of this size of 5×5 dots. Point P0 shown in FIG. 8 corresponds to point 70 of FIG. 7. Points P1–P4 of FIG. 8 are points adjacent to point 70 of FIG. 7.

At step SP4, a straight line group passing through points P1–P4 with point P0 as the origin is subjected to Hough transform, whereby a graph as shown in FIG. 9 is obtained as the curve of the $\rho$-$\theta$ plane. When Hough transform has been carried out for all the points at step SP5, the process proceeds to step SP7 where estimation of a tangent line is carried out. If Hough transform is not yet carried out for all the points, the remaining points are selected to be transformed at step SP6. At step SP4, envelopes 90 and 91 are generated together with the transformation process. Because envelope 90 is the maximum value of $\rho$ of a certain $\theta$, and envelope 91 is a minimum value of $\rho$ of $\theta$, only the maximum and minimum values of $\rho$ is required to be identified while increasing the value of $\theta$.

Because the area for carrying out Hough transform is very small centered about the origin as in the present embodiment, the $\rho$-$\theta$ relation of a point that is leftwards by 1 dot from the origin may be calculated in advance and a data table of that result prepared. By identifying the relation of $\rho$-$\theta$ for points P1–P4 by just reading out from the data table, calculation will not be required. Since the calculation of Hough transform includes a trigonometric function as shown in equation (2), it will be time consuming if calculation is carried out for each point in the case of a large number of points. The time required for calculation can be reduced significantly by just referring to the data table. At step SP7, the difference of the obtained envelopes 90 and 91 is obtained, whereby a tangent line can be predicted from the smallest difference of $\theta$.

Although the $\rho$-$\theta$ plane can be divided into mesh cells in which the number of crossings for each mesh cell is counted in a normal process of Hough transform, the detection accuracy of the values of $\rho$ and $\theta$ is greatly dependent upon the specification of the size of the mesh cell. Because only the difference of the envelopes is to be obtained in the present invention, the values of $\rho$ and $\theta$ can be obtained in a level of accuracy similar to that of angles that can be dealt with a computer. Also, the number of points to be calculated for transformation is reduced by one in comparison with a conventional Hough transform because point P0 is set as the origin. Because the result of the Hough transform can be carried out just by identifying the maximum and minimum values of $\rho$, the number of arrays used can be reduced significantly to simplify the calculation. Furthermore, because the region in which Hough transform is to be carried out is a very small region centered about the origin, the range of $\rho$ and $\theta$ is also small, and the relationship of $\rho$ and $\theta$ can be prepared in advance in a data table. The array of the data table to be prepared can also be reduced. Therefore, because it is not necessary to calculate Hough transform for each point requiring a great time length, the time required for calculation can be reduced significantly.

Because the calculation time is reduced significantly in comparison with a conventional Hough transform while carrying out an operation that is equal in the detection accuracy of a line, prediction of the direction of a normal line that is higher in accuracy in comparison with the method using the difference can be carried out in a relatively shorter calculation time period even if the contour is of a complex configuration in determining the direction of a tangent line for each point on a contour.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system comprising:
   input means for entering an image;
   line extracting means for extracting a straight line going through a selected point on said image entered by said input means according to Hough transform with said selected point as the origin, said line extracting means having
   (a) contour extracting means for extracting a contour according to the continuous state of pixels forming said image entered by said input means,
   (b) region determinating means for determining a region in which said selected point and adjacent points go through said region, and
   (c) transformation means for carrying out Hough transform of said straight line with said selected point as the center point of said region and as the origin to predict said contour; and
   output means for providing the extraction result by said line extracting means.

2. The image processing system according to claim 1, further comprising smoothing means for smoothing said contour extracted by said contour extracting means.

3. The image processing system according to claim 2, wherein said smoothing means comprises a Gaussian filter.

4. The image processing system according to claim 1, wherein said transformation means comprises
   means for carrying out Hough transform for all points adjacent to said origin for obtaining an envelope, and
   means for estimating a tangent line from said obtained envelope lines.

* * * * *